United States Patent
Port et al.

(10) Patent No.: US 11,069,259 B2
(45) Date of Patent: Jul. 20, 2021

(54) TRANSMODAL TRANSLATION OF FEATURE VECTORS TO AUDIO FOR ASSISTIVE DEVICES

(71) Applicant: FUJIFILM Business Innovation Corp., Tokyo (JP)

(72) Inventors: Andrew Allan Port, Santa Cruz, CA (US); Doga Buse Cavdir, Stanford, CA (US); Chelhwon Kim, Palo Alto, CA (US); Miteshkumar Patel, San Mateo, CA (US); Donald Kimber, Foster City, CA (US); Qiong Liu, Cupertino, CA (US)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 16/845,443

(22) Filed: Apr. 10, 2020

(65) Prior Publication Data

US 2021/0097888 A1 Apr. 1, 2021

Related U.S. Application Data

(60) Provisional application No. 62/909,088, filed on Oct. 1, 2019.

(51) Int. Cl.
*G09B 21/00* (2006.01)

(52) U.S. Cl.
CPC ................... *G09B 21/006* (2013.01)

(58) Field of Classification Search
None
See application file for complete search history.

(56) References Cited

U.S. PATENT DOCUMENTS

| | | | |
|---|---|---|---|
| 10,693,872 B1 * | 6/2020 | Larson | H04L 9/3228 |
| 10,909,459 B2 * | 2/2021 | Tsatsin | G06N 3/084 |
| 2020/0034619 A1 * | 1/2020 | Gibbon | G06T 7/70 |
| 2020/0051565 A1 * | 2/2020 | Singh | G10L 15/02 |

OTHER PUBLICATIONS

Amos, B., et al., OpenFace: A General-Purpose Face Recognition Library with Mobile Applications, Technical Report CMU-CS-16-118, Carnegie Mellon University School of Computer Science, Pittsburgh, PA, 2016, 20 pgs.

(Continued)

*Primary Examiner* — Adolf Dsouza
(74) *Attorney, Agent, or Firm* — Procopio, Cory, Hargreaves & Savitch LLP

(57) ABSTRACT

A computer implemented method is provided that includes embedding a received signal in a first modality, re-embedding the embedded received signal of the first modality into a signal of a second modality, and generating an output in the second modality, and based on the output, rendering a signal in the second modality that is configured to be sensed, wherein the embedding, re-embedding and generating applies a model that is trained by performing an adversarial learning operation associated with discriminating actual examples of the target distribution from the generated output, and performing a metric learning operation associated with generating the output having perceptual distances.

20 Claims, 7 Drawing Sheets
(4 of 7 Drawing Sheet(s) Filed in Color)

(56) References Cited

OTHER PUBLICATIONS

Arandjelovic, R., e al., NetVLAD: CNN Architecture for Weakly Supervised Place Recognition, IEEE Computer Vision and Pattern Recognition (CPR) 2016, May 2, 2016, 17 pgs.

Bunker, D., Speech2Face: Reconstructed Lip Syncing with Generative Adversarial Networks, Data Reflexions: Thoughts and Projects, 2017, 8 pgs.

Connors, E. C., et al., Action Video Game Play and Transfer of Navigation and Spatial Cognition Skills in Adolescents who are Blind, Frontiers in Human Neuroscience 8(133), Mar. 2014, 9 pgs.

Engel, J., et al., Neural Audio Synthesis of Musical Notes with WaveNet Autoencoders, ICML '17: Proceedings of the 34th International Conference on Machine Learning, 70, Aug. 2017, pp. 1068-1077.

Goodfellow, I. J., et al., Generative Adversarial Nets, Advances in Neural Information Processing Systems, 27, 2014, 9 pgs.

Hermans, A., et al., In Defense of the Triplet Loss for Person Re-Identification, arXiv:1703.07737, 2017, 15 pgs.

Niagrani, A., et al., Seeing Voices and Hearing Faces: Cross-Modal Biometric Matching, Proceedings of the IEEE Conference on Computer Vision and Pattern Recognition, 2018, pp. 8427-8436.

Panayotov, V., et al., Librispeech: An ASR Corpus Based on Public Domain Audio Books, 2015 IEEE International Conference on Acoustics, Speech and Signal Processing (ICSSP) 2015, 5206-5210.

Peng, X, et al., Reconstruction-Based Disentanglement for Pose-Invariant Face Recognition, IEEE International Conference on Computer Vision (ICCV) 2017, pp. 1623-1632.

Schroff, F., et al., FaceNet: A Unified Embedding for Face Recognition and Clustering, Proceedings of the IEEE Conference on Computer Vision and Pattern Recognition, 2015, pp. 815-823.

Stiles, N. R. B., et al., Auditory Sensory Substitution in Intuitive and Automatic with Texture Stimuli, Scientific Reports, 5:15628, 2015, 14 pgs.

\* cited by examiner

TRANSMODAL TRANSLATION OF FEATURE VECTORS TO AUDIO FOR ASSISTIVE DEVICES

CROSS-REFERENCE TO RELATED APPLICATIONS

This application claims priority to U.S. Patent Application No. 62/909,088 filed on Oct. 1, 2019, the contents of which are incorporated herein by reference.

BACKGROUND

Field

Aspects of the example implementations relate to methods, systems and user experiences associated with transmodal translation of the feature vector from a first modality to a second modality, and more specifically, an approach that applies deep learning in association with adversarial learning and metric learning, while preserving geometric structure.

Related Art

Humans may desire sensory feedback, such as through the eyes and ears. However, some humans may have visual impairment, such that they are not able to obtain sensory feedback in the eyes. Further, some humans may need feedback from medical devices, such as prosthetics. Generally speaking, a human may wish to augment his or her neurological or biological systems, and receive a robust form of feedback, especially if they have a visual impairment or the like.

For example, but not by way of limitation, the sense of sight permits a human to briefly glance at a target (e.g., one second), such as a room or interface, and then be able to describe key features associated with at target. However, if the key features being described that are associated with the object are longer than just a few words or require further context or description, the amount of time required to communicate the key features may be too long, such as more than a second, due to the need to communicate the output in spoken words of a language, such as English. Thus, the related art approach of using language communication alone may be insufficient.

Other than humans, some animals such as bats may be able to use auditory systems for navigation instead of using visual navigation. However, such approaches may not be effective for humans, due to differences in ability to sense and hear signals at various frequency ranges. However, the related art technology does not possess such capability.

Related art approaches to deep learning have provided methods of effectively embedding high-level visual information in relatively low-dimensional Euclidean space. However, there is an unmet need in the related art deep learning approaches to be able to translate between a person modality, or sense, and a second modality, or sense, in a geometry-preserving manner.

SUMMARY

According to an aspect of the example implementations, a computer implemented method is provided that includes embedding a received signal in a first modality, re-embedding the embedded received signal of the first modality into a signal of a second modality, and generating an output in the second modality, and based on the output, rendering a signal in the second modality that is configured to be sensed, wherein the embedding, re-embedding and generating applies a model that is trained by performing an adversarial learning operation associated with discriminating actual examples of the target distribution from the generated output, and performing a metric learning operation associated with generating the output having perceptual distances.

Example implementations may also include a non-transitory computer readable medium having a storage and processor, the processor capable of executing instructions for transforming information of information from a first modality to a second modality in a manner that preserves perceptual distance.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
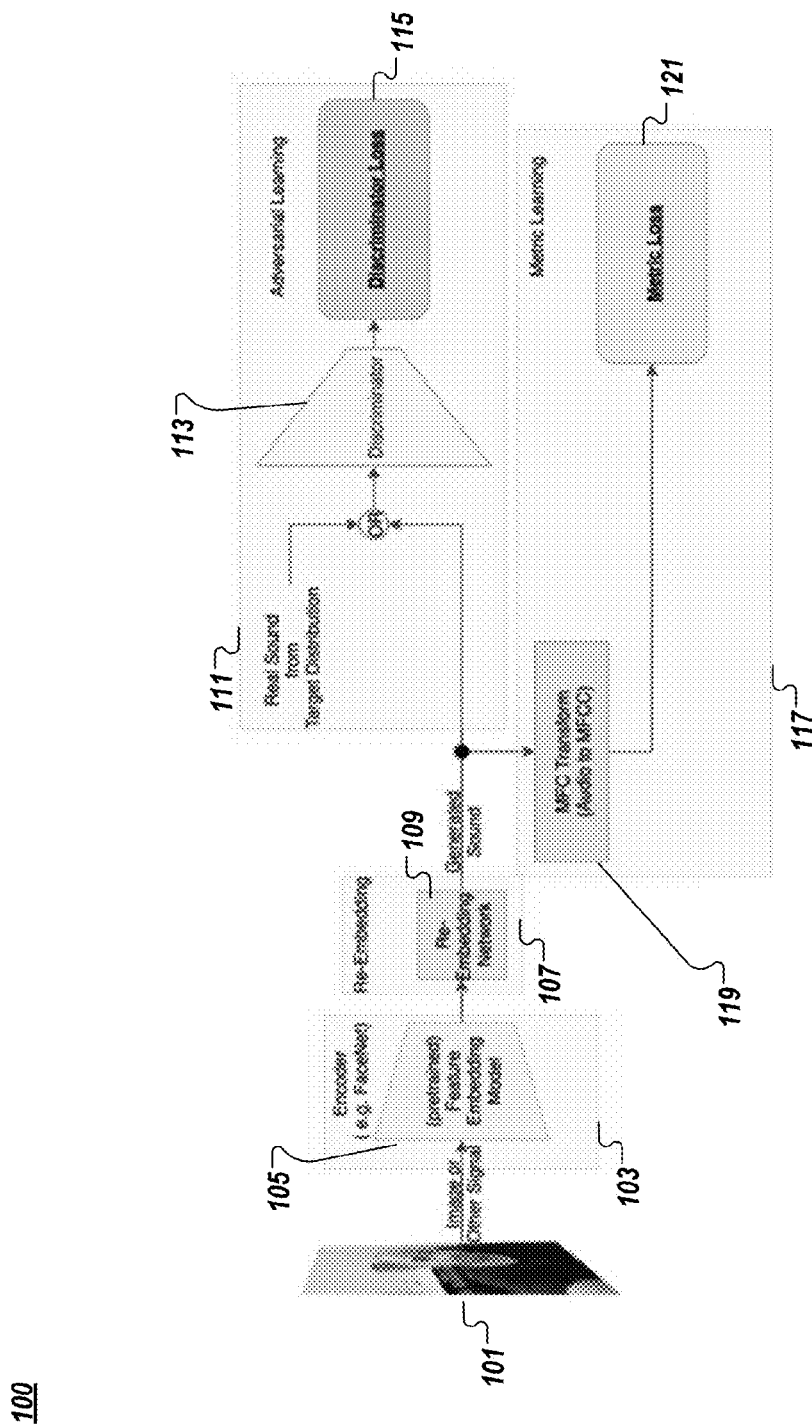
FIG. 1 illustrates an example implementation, showing a pipeline.

The following detailed description provides further details of the figures and example implementations of the present application. Reference numerals and descriptions of redundant elements between figures are omitted for clarity. Terms used throughout the description are provided as examples and are not intended to be limiting.

Aspects of the example implementations are directed to a deep learning based system that high-level information extracted from of a first modality such as a visual (or other type of) signal and represents it as a second modality such as acoustically. The target audio distribution may be tailored to any distribution of sounds of sufficient size (e.g., human speech).

While speech is disclosed as a sound, other sounds may be substituted therefor. For example but not by way of limitation, instead of using a human speech sound, another sound, such as music, may be used, either in substitution or conjunction with human speech sound.

According to the example implementations, the signal to audio translation system preserves the learned geometric relationship between any signals that a feature embedding model can be taught to differentiate between (e.g. faces, objects, emotions, etc.). As a result, sounds may be generated that contain perceptually audible high-level information that can be used by the sensory impaired user, in a manner that may permit them to better understand their environment. The example implementations may accomplish this without requiring annotated data to learn the mapping between high level image features to audio.

As explained above with respect to the related art, when using a spoken language to communicate visual information to a person with a visual impairment, brevity can be a challenge. Aspects of the example implementation are directed to systems and methods associated with leveraging machine learned feature embedding to translate visual information to a perceptual audio domain. The Euclidean geometry of the embedding may be preserved between the first modality and the second modality. For example, but not by way of limitation, the distance between untranslated feature vectors is equal (or strongly equivalent to) a mel cepstrum-based pychoacoustic distance between the corresponding translations (e.g., audio signals).

Additionally, the example implementations do not require annotated data to learn the mapping between high-level feature (e.g. faces, objects, emotions) and audio. Instead, the example implementations learn the association using adversarial learning, as explained in greater detail below.

According to the example implementations, transmodal translation of feature vectors from a first modality to a second modality is provided. More specifically, transmodal translation from a visual modality to an audio modality is provided, such as may be employed in assistive devices.

More specifically, a geometric structure may be transferred. For example but not by way of limitation, in an example use case of facial recognition, a visual impression may be provided of a face, which is embedded in a multi-dimensional sphere, such as a 128 dimensional sphere. A triplet loss function is applied, such that similar faces will appear to be closer, and/or different faces will appear to be further apart. Then, the above explained embedded images may be transferred to the audio domain according to the example implementations, to be associated with audio signals. More specifically, sounds may be differentiated, in a manner that correlates to human intuition. Further, interpolation may be performed between sounds. More specifically, where there is a space between two sounds that constitutes the closest match to the data point of the first modality, the appropriate sound may be generated by interpolation between sounds, particularly with respect to human speech.

According to one example implementation, a deep learning based framework translates high-level information extracted from an image or other signal (e.g. facial identity/expression, location of objects, etc.) into audio. This example implementation can be built on any feature embedding model that embeds inputs in a subset of Euclidean space (i.e., any model, f: X->Y, where $\|f(y_1)-f(y_2)\|_2$ is meaningful).

According to the example implementations, a pretrained feature embedding model capable of extracting desired features from an image is provided. This model may also be referred to as a "base model". Training is then performed on the re-embedding network, which maps the outputs of the base model into a target perceptual audio domain. This perceptual audio domain can be determined by any sufficiently large and diverse dataset of sounds.

More specifically, a generative adversarial learning (GAN) approach is used to train the re-embedding network. For example, the GAN approach enforces that i) output sounds fit into the distribution of sounds specified by the target dataset, and ii) distances between outputs of the base model, and distances between the corresponding outputs of the re-embedding model, are equal. In the example implementations, the distance between two audio signals may be computed by taking the sum of squared differences of those signals' Mel-frequency cepstral coefficients (MFCCs). However, use of MFCCs alone for perceptual distance may have various demerits (e.g., error based on similarity of noises); thus, the use of MFCCs is used in combination as explained below. Moreover, the training data may include the original dataset, another relevant dataset, or randomly generated arrays of the same shape as the output associated with the base model.

FIG. 1 illustrates a pipeline 100 according to the example implementations. More specifically, an input signal, such as a signal associated with an image 101, or other input signal, is provided to an encoder 103. For example, but not by way of limitation, the encoder 103 may be FaceNet, but is not limited thereto. The encoder 103 performs the operation of encoding the input signal or image 101 from a high dimensional space into a vector, or a higher rank tensor. More specifically, the encoder 103 may include, but is not limited to, a feature embedding model 105, such as a feature embedding network. Optionally, the feature embedding model 105 may be pre-trained and fixed, or nondifferentiable/untrainable. According to one example implementation, the feature embedding network may employ an OpenFace implementation of FaceNet. However, the present example implementations are not limited thereto.

An output of the encoder 103 is provided to a re-embedding block 107, including a re-embedding network 109. The re-embedding block 107 sends the feature map, which is the output of the encoder 103, into audio space. To provide control over the type of sounds generated by the network, a "discriminative" network is provided, to transform the feature vectors to sounds that fit into a target distribution of sounds.

An output of the re-embedding network 107, which is a generated sound, is provided for adversarial learning 111, and for metric learning 117. The adversarial learning 111 is provided to improve the ability of a discriminator 113 to distinguish between real sounds and generated sounds, and to improve and ability of the generator to generate sounds that will fool the discriminator 113. According to the example implementation, the generator may comprise the re-embedding network 107 alone, or a combination of the encoder 103 and the re-embedding network 107.

More specifically, to enforce the output sounds fit into a target distribution, a discriminator network is employed. The discriminator network is trained to predict whether or not a sound originated from the target distribution or was synthesized by the generator. The generator network (i.e. the re-embedding network) is trained with two goals: 1. to fool the discriminator, and 2. to ensure that the distance between any two generated outputs (e.g. sounds) is approximately equal (up to a scaling constant) to the distance the two corresponding inputs. During training, the discriminator network receives examples of generated sounds, as well as examples of "real sounds", which are sounds from the target distribution. Accordingly, a discriminator loss is generated at 115. Along with the metric learning, and the metric loss as explained below, the model according to the example dictation is a generated adversarial network (GAN).

The metric learning 117 is provided to encourage output sounds to have meaningful perceptual distances. More specifically, where the encoder 103 is fixed, or nondifferentiable, or does not allow weight updates, a metric loss function based on MFCCs 119, is provided. The MFCC transform 119 enforces that the translation from the image/signal to the sound preserves the metric that was learned by the pre-trained encoder 103. More specifically, the metric loss function may include the function shown below in relationship (1):

$$\mathcal{L} = \sum_{i,j=1,\ldots,N} |\,\|MFCC(y_i) - MFCC(y_j)\|_2 - \|\varphi(x_i) - \varphi(x_j)\|_2| \quad (1)$$

where N is the batch size, φ is the Encoder, and $x_i$ and $y_i$ are the ith image (or signal) in our input batch and the generated audio output respectively. Accordingly, the metric losses generated at 121.

Under certain conditions, such as when is not cost prohibitive to do so, the training data is available, and the encoder 103 is differentiable and trainable, optionally, the example implementations may permit weight updates on the encoder 103. Further, as another optional example approach, the example implementations may permit the system to be trained end-to-end, from scratch. Accordingly, an appropriate distance-based loss function (e.g. triplet loss) is used in lieu of relationship (1).

Figure 2:
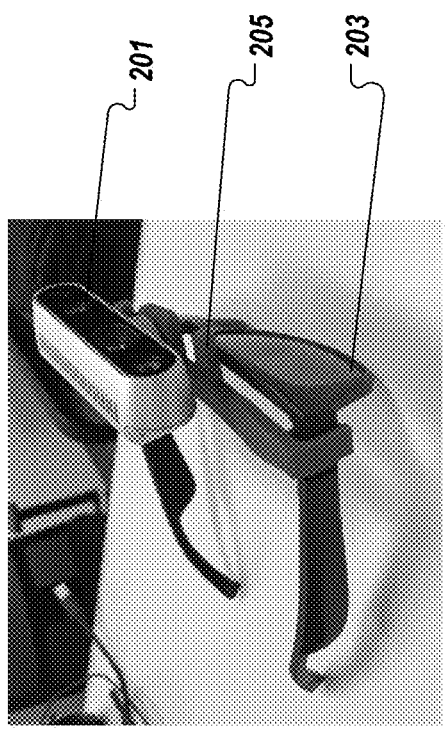
FIG. 2 illustrates a prototype according to the example implementation.

According to an example implementation, a prototype may be provided to include relevant hardware in combination with the foregoing aspects. For example, but not by way of limitation, as shown in FIG. 2, a prototype 200 of wearable hardware is provided. For example, but not by way of limitation, a visual input device 201, such as a camera, may be mounted on a wearable device 203, such as eyeglass frames, which include an audio output, such as "open ear" headphones (e.g., stereo speakers) embedded therein. The camera may be a depth camera, which is attached to the glasses by an attachment piece 205. According to this example implementation, the user may wear the apparatus, and as the user moves their head, they would be able to have the camera capture the image, and provide an output sound associated with one or more objects in the image.

However, the example implementations are not limited thereto, and other structures that are configured to receive or capture an image, which may be associated with the position on or worn by a user, may be provided (e.g., hat, watch, clothing, medical device, mobile phone, or any other object that may be position on or in conjunction with the user). Further, the audio output may also be provided by other speaker, headphone or approach as would be understood by those skilled in the art.

According to one example implementation of FIG. 2, spatialized audio and an RGBD camera is employed, to provide the user with functionality to communicate the position and the depth of objects detected by the example implementations. More specifically, the objects Those generated sounds may be played back using spatialized audio, to indicate their identity, location and/or other properties in a manner that is perceived to be natural.

Figure 3:
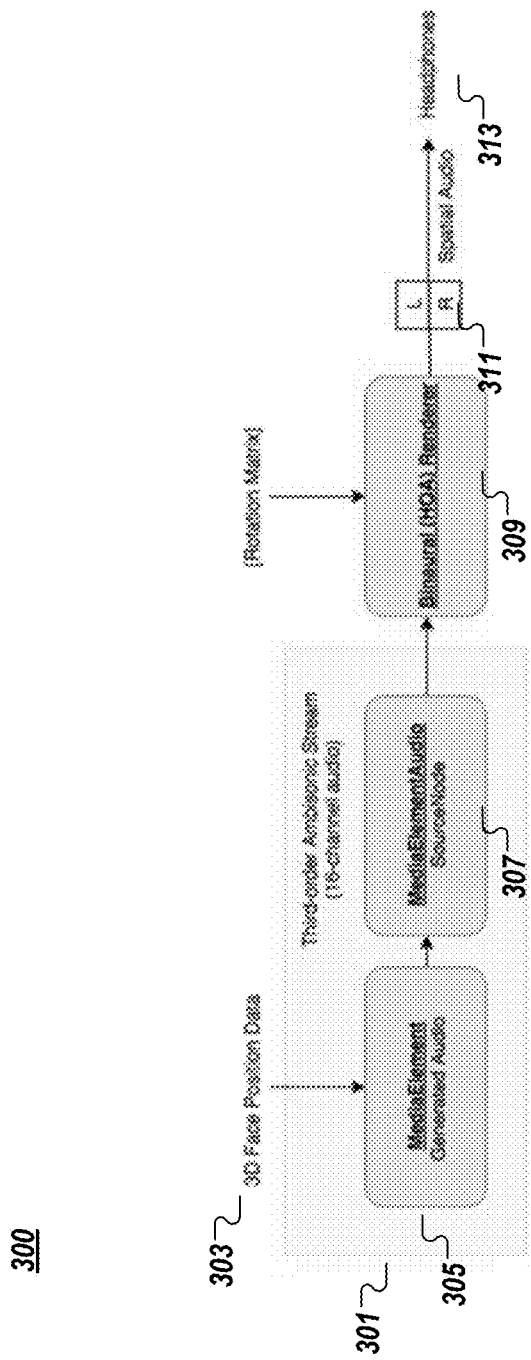
FIG. 3 illustrates a spatial audio rendering approach according to an example implementation.

FIG. 3 shows an overview of the spatial audio rendering system 300 according to the example implementations. More specifically, the example implementations take the audio samples, and generate source nodes associated with each of the samples or faces in a scene. Thus, the location of the object in the image is translated, with the distance data to sound source positions in the auditory scene.

For example, but not by way of limitation, at 301, 3-D face position data of 303 is received and provided to a media element function at 305, which includes generated audio. At 307, the source node is created by the media element audio function. At 309, a renderer is applied, such as by application of the rotational matrix, and is accordingly generated as the left and right audio channels 311, which is in turn output to the headphones at 313.

The foregoing example implementations may be evaluated. For example, but not by way of limitation, the FaceNet-based model may be used to perform a preliminary user study to evaluate the example implementations with respect to one or more areas.

According to one evaluation approach, perceptual agreement with the metric may be evaluated. Given two randomly selected images of either the same face or two different faces, a determination may be made as to whether the two corresponding sounds output by the example implementations are perceived by humans as being the same or different, respectively. For example but not by way of limitation, this evaluation would be based on different faces being perceived to be associated with different sounds, and same or similar faces being perceived to be associated with the same or similar sounds.

According to another evaluation approach, memorability of sounds may be evaluated. Given k randomly selected images of different faces, a determination may be made as to whether users can effectively memorize the output sounds. According to an example evaluated approach, user performance memorizing generated sound-identity pairings may be compared with respect to control pairing made from randomly assigned English names. For example but not by way of limitation, this evaluation would be associated with a user being able to easily learn to recall a meaning associated with a sound, such as the user remembering that the sound is associated with a person.

According to yet another evaluated approach, question answering and unintended feature extraction may be evaluated. For example, but not by way of limitation, the ability of users to extract simple patterns from the generated sounds may be tested, such as whether faces wearing glasses sound different from those not wearing glasses, whether hair color can be heard, or the like.

Figure 4:
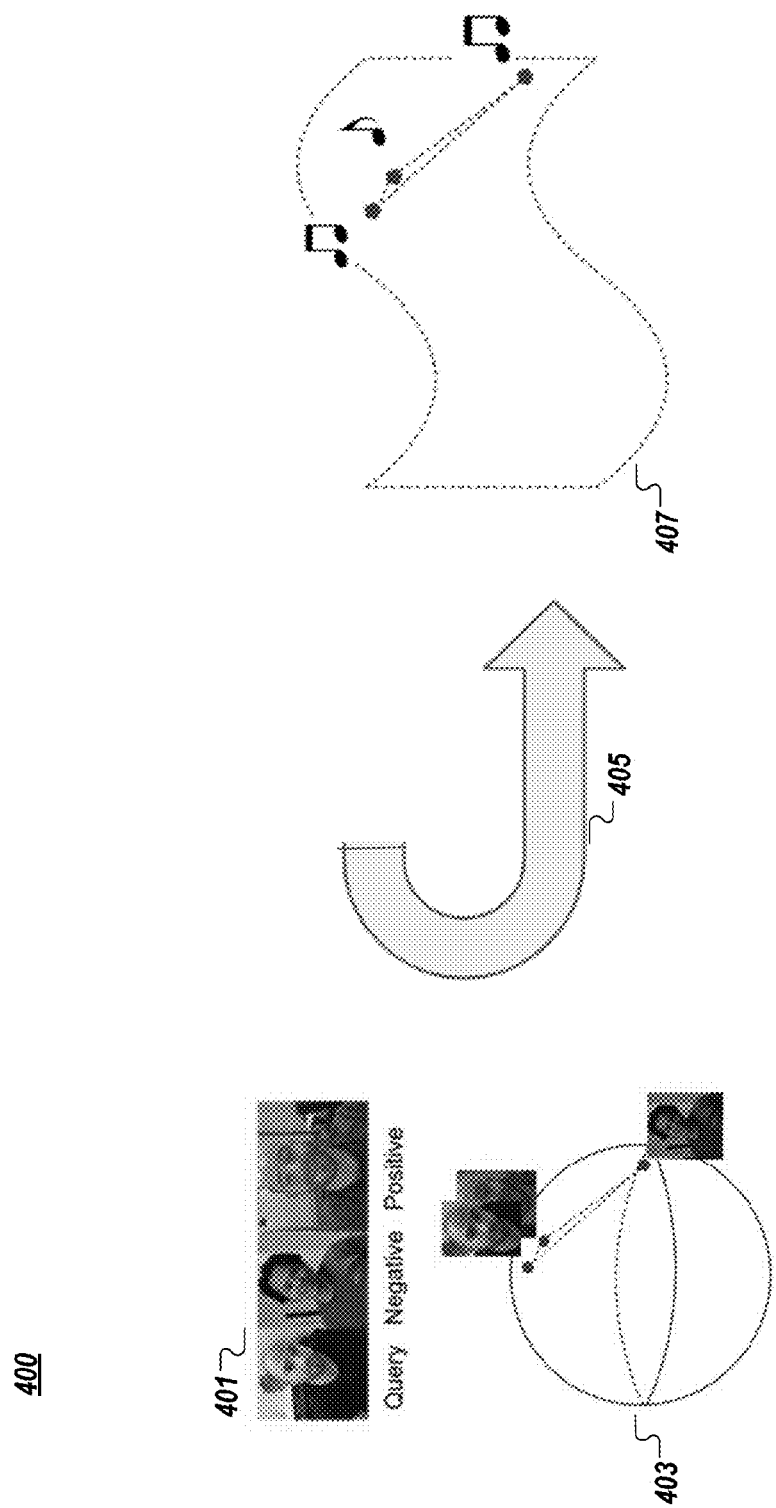
FIG. 4 illustrates an interpolation approach according to an example implementation.

FIG. 4 illustrates an approach 400 according to the example implementations associated with transformation from the first modality to the second modality. Here, the first modality is sight, and the second modality is sound. Here, the term "modality" may refer to a mode associated with sensed information, such as sight, sound, temperature, pressure, etc. For example, a determination must be made as to the information that is desired to be communicated. According to the present example implementation, with respect to sight-based information, such as faces 401, an encoder may be used as explained above.

The encoder may be any encoder that is trained with the distance based loss. For example but not by way of limitation, FaceNet, a network designed to embed images faces as 128 dimensional unit vectors in such a way that images of similar faces are sent to similar vectors (by L2 distance) as the encoder, could be used as the encoder. The translation system would then provide a mapping from images of faces to sounds such that similar faces would be mapped to similar sounds and dissimilar faces would be mapped to dissimilar sounds. The target dataset, for example but not by way of limitation may be composed of human speech. The generated sounds would then also be similar to human speech, although would not necessarily be recognizable words or phrases.

As shown at 403, images of faces are embedded in a high-dimensional sphere. Faces having a smaller distance based loss are deemed to be more similar, whereas faces having a larger distance based loss are deemed to be less similar.

At 405, the sound is generated to fit with a target distribution of sounds. The data set is selected to be sufficiently large and varied with respect to the sound samples to provide audio signals that may correlate to intuitive similarities between sounds that a user may understand or be able to learn to effectively interpret.

At 407, adversarial learning and metric learning are applied, as explained above, including the calculation of metric loss discriminator loss, to ensure that the sound sample that is selected is most closely correlated to the intuition.

While the foregoing example implementations are directed to transformation from a first modality to a second modality in a manner that provides the user with a recognizable speech associated with a face, the present example implementations are not limited thereto, and other applications may be combined with or substituted for the foregoing example without departing from the inventive scope.

For example but not by way of limitation, the example implementations may be used in systems associated with navigational assistance, such as assisting a visually impaired user to navigate an environment. Sound information may be provided on depth and obstacles, such that the user may be able to effectively navigate environment, despite visual impairment. In some example implementations, this may be focused on a user walking, such as a train station or other busy area. However, the present example implementations are not limited thereto, and other navigational purposes may be considered, such as a visually impaired person being able to participate in activities such as sports, hobbies, etc. that may have been previously to difficult or dangerous.

The example implementations may also be used in association with assisting visually impaired users with being able to see. Further, a user, whether visually impaired or not, may be provided with visual inputs outside of the standard range of you, so that a user may be able to be provided with information outside of that range, such as being able to see behind the back of the user. Such an approach may also be useful for users who are impaired in other manners, such as having a neck or back injury and not being able to turn their head, but desiring to be able to navigate in human traffic, driving, or other situations where twisting of the neck or back would permit the user to be able to perform functions in an environment.

Similarly, the example implementations may provide a user with the ability to see in spectral domains other than those that are typically visible. For example, but not by limitation, the translation may be from a first visual domain to a second visual domain, or an audio domain to a visual domain. Further, the present example implementation is not limited to two domains, and multiple domains may also be involved (e.g., temperature, visual, pressure or others).

The example implementations may also provide a user with feedback, such as feedback associated with a prosthetic limb, or a robotic arm. For example, pressure-sensing information in a first domain may be transformed to an audio feedback, to provide an audio output to inform the user that of the appropriateness of the pressure level.

According to another example implementation, an audio input may be provided as the first modality in an industrial setting, which is transformed to a second modality, such as visual. For example, but not by way of limitation, equipment that is operating within standard range typically emits a vibration within a range. However, when equipment is approaching a failure event or a maintenance period, the sound emitting by the equipment may change, or other sound may be emitted by the equipment, which cannot be visually detected (e.g., microfissures or internal cracks), or cannot be accessed easily due to expense or egress/ingress difficulty. When the example implementations sense such sounds, a translation may be performed to a second modality to provide maintenance information about a part that is about to fail, or regarding a maintenance event.

Further, the example implementations may also be directed to image caption translation, such as in a video, motion picture, close captioning or the like.

Figure 5:
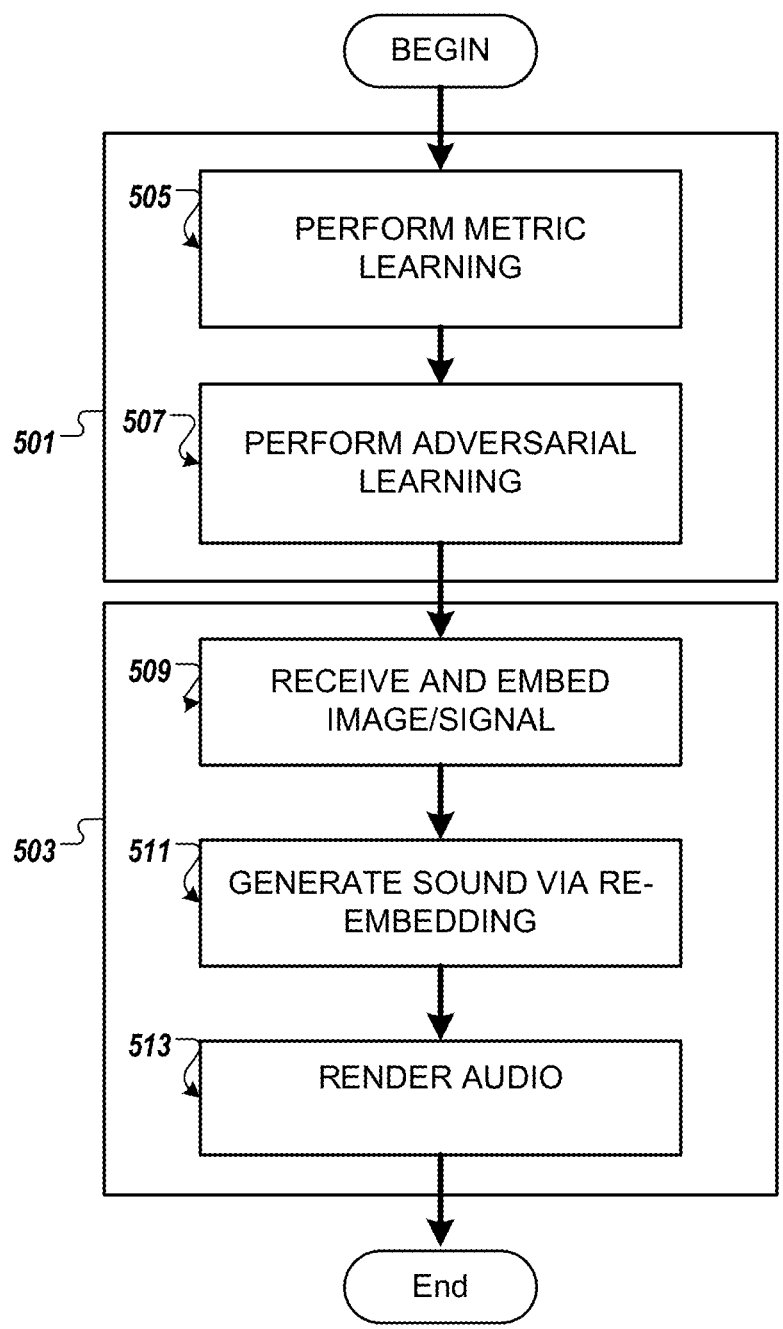
FIG. 5 illustrates an example process for some example implementations.

FIG. 5 illustrates an example process 500 according to the example implementations. The example process 500 may be performed on one or more devices, as explained herein. The example process may include learning 501 and inference 503.

At learning 501, an adversarial learning operation 505 may be performed. As explained above, for a discriminator that may discriminate between a real sound and a generated sound, a discriminator loss is generated. At 507, by use of the MFC transform, a metric loss is determined, for example by using the metric loss function as explained above. Accordingly, the output audio information may generate sounds having meaningful perceptual distances.

Once the model has been trained in learning 501, then at inference 503, information is received in a first modality at 509, such as an image or signal. As explained above, an encoder may be used to perform embedding, such as by using a feature embedding model.

At 511, the information of the first modality that has been embedded is translated into a second modality. In the present example implementations, the first modality is the image or signal, and the second modality is a sound associated with the image or signal. For example but not by way of limitation, the re-embedding network may be used to perform the operation of determining an appropriate sound, based on distance loss between sounds that correspond to the images.

At 513, audio may be rendered. For example but not by way of limitation, an output may be provided to headphones, or to the aforementioned device associated with the wearable glasses having an audio output at or near the ear, to provide the audio output to the user in the second modality. Further, backpropagation may be performed between the inference 503 and the learning (e.g., training) 501, as would be understood by those skilled in the art.

For the model trained at 501 on a suitable and sufficient dataset, similar new faces may be translated to similar new sounds, and dissimilar new faces may be translated to dissimilar new sounds. Those sounds will still fit into the target distribution.

Moreover, once the model has been trained, the model has a sound associated with every possible face (e.g., "no ambient discrimination technique", such that all possible faces may have a unique sound assigned to them, and that distances can still be preserved, even if the unit vector produced by the encoder is different from previously encountered unit vectors.

According to the example implementations, it is not necessary to force the sounds reserved for each of the faces to fit into the target audio distribution, it is only necessary that the distances between these points IS still preserved as the images are translated into audio. As a result, each possible face has a unique sound assigned to it. According to this approach, the model may be assisted to learn the source domain's geometry as the inputs the model receives during training are more uniformly distributed.

Figure 6:
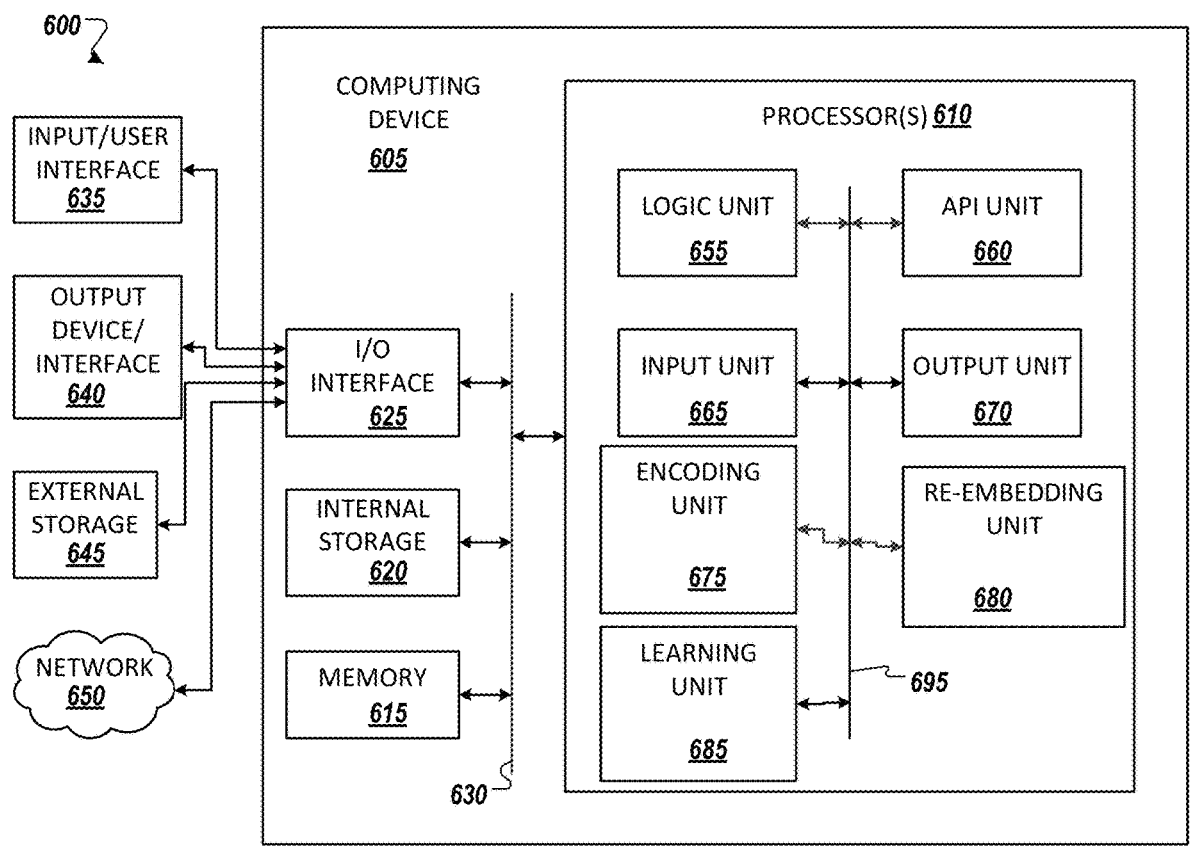
FIG. 6 illustrates an example computing environment with an example computer device suitable for use in some example implementations.

FIG. 6 illustrates an example computing environment 600 with an example computer device 605 suitable for use in some example implementations. Computing device 605 in computing environment 600 can include one or more processing units, cores, or processors 610, memory 615 (e.g., RAM, ROM, and/or the like), internal storage 620 (e.g., magnetic, optical, solid state storage, and/or organic), and/or I/O interface 625, any of which can be coupled on a communication mechanism or bus 630 for communicating information or embedded in the computing device 605.

According to the present example implementations, the processing associated with the neural activity may occur on a processor 610 that is the central processing unit (CPU). Alternatively, other processors may be substituted therefor without departing from the inventive concept. For example, but not by way of limitation, a graphics processing unit (GPU), and/or a neural processing unit (NPU) may be substituted for or used in combination with the CPU to perform the processing for the foregoing example implementations.

Computing device 605 can be communicatively coupled to input/interface 635 and output device/interface 640. Either one or both of input/interface 635 and output device/interface 640 can be a wired or wireless interface and can be detachable. Input/interface 635 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 640 may include a display, television, monitor, printer, speaker, braille, or the like. In some example implementations, input/interface 635 (e.g., user interface) and output device/interface 640 can be embedded with, or physically coupled to, the computing device 605. In other example implementations, other computing devices may function as, or provide the functions of, an input/interface 635 and output device/interface 640 for a computing device 605.

Examples of computing device 605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 605 can be communicatively coupled (e.g., via I/O interface 625) to external storage 645 and network 650 for communicating with any number of networked components, devices, and systems, including one or more computing devices of the same or different configuration. Computing device 605 or any connected computing device can be functioning as, providing services of, or referred to as, a server, client, thin server, general machine, special-purpose machine, or another label. For example but not by way of limitation, network 650 may include the blockchain network, and/or the cloud.

I/O interface 625 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 600. Network 650 can be any network or combination of networks (e.g., the Internet, local area network, wide area network, a telephonic network, a cellular network, satellite network, and the like).

Computing device 605 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 610 can execute under any operating system (OS) (not shown), in a native or virtual environment. One or more applications can be deployed that include logic unit 655, application programming interface (API) unit 660, input unit 665, output unit 670, encoding unit 675, re-embedding unit 680, learning unit 685, and inter-unit communication mechanism 695 for the different units to communicate with each other, with the OS, and with other applications (not shown).

For example, the encoding unit 675, the re-embedding unit 680, and the learning unit 685 may implement one or more processes shown above with respect to the structures described above. The described units and elements can be varied in design, function, configuration, or implementation and are not limited to the descriptions provided.

In some example implementations, when information or an execution instruction is received by API unit 660, it may be communicated to one or more other units (e.g., logic unit 655, input unit 665, encoding unit 675, re-embedding unit 680, and learning unit 685).

For example, the encoding unit 675 may receive and process information in the first modality, from simulated data, historical data, or one or more sensors, as explained above. An output of the encoding unit 675 is provided to the re-embedding unit 680, which performs the necessary operations to generate the sound as described above and illustrated in FIGS. 1-7, for example. Additionally, the learning unit 685 may perform operations, such as adversarial learning and metric learning, based on the outputs of the encoding unit 675 and the re-embedding unit 680, and using the metric loss function, to discriminate between real and generated sounds, and to encourage the output sounds to have meaningful perceptual distances.

In some instances, the logic unit 655 may be configured to control the information flow among the units and direct the services provided by API unit 660, input unit 665, encoding unit 675, re-embedding unit 680, and learning unit 685 in some example implementations described above. For example, the flow of one or more processes or implementations may be controlled by logic unit 655 alone or in conjunction with API unit 660.

Figure 7:
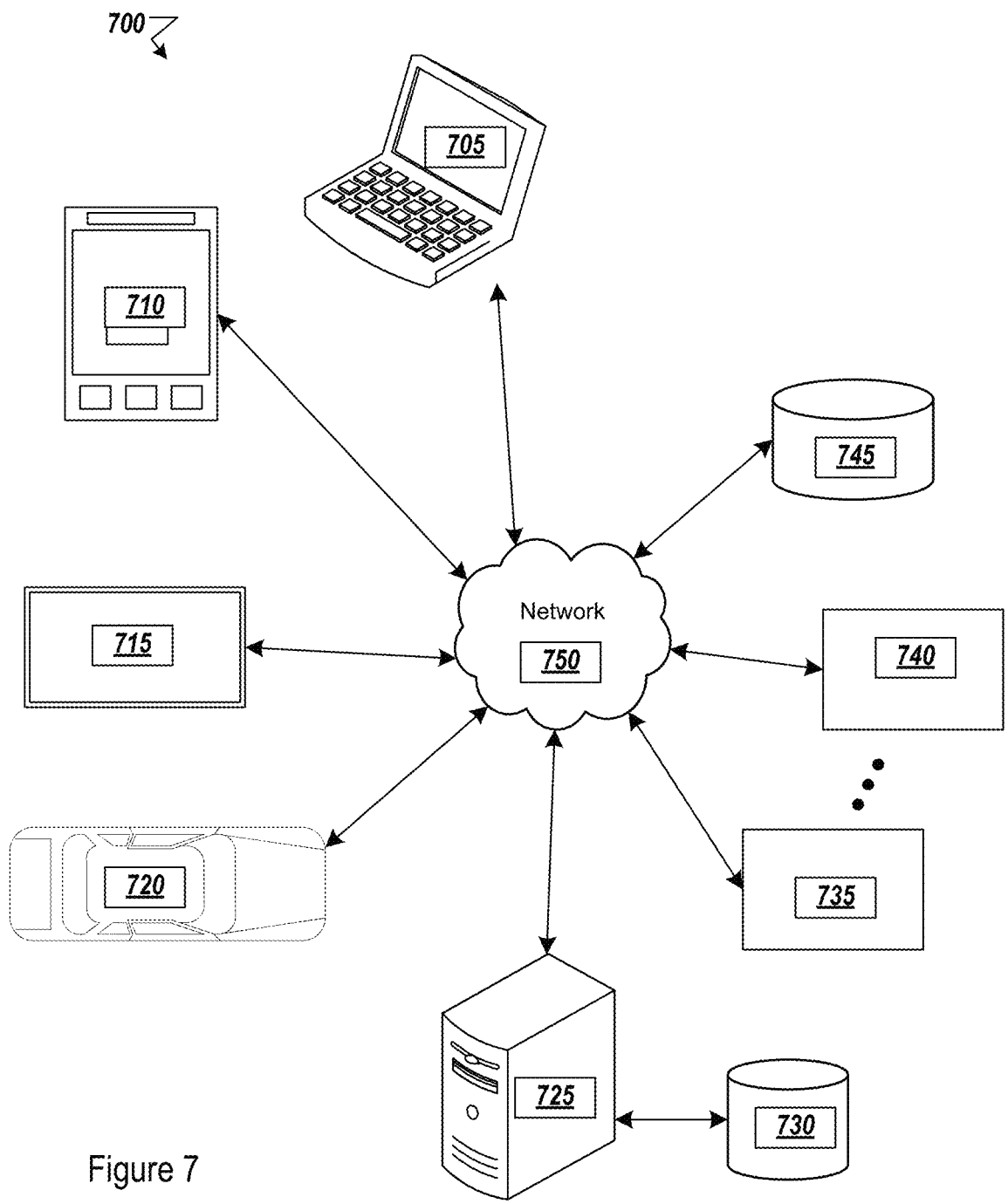
FIG. 7 shows an example environment suitable for some example implementations.

FIG. 7 shows an example environment suitable for some example implementations. Environment 700 includes devices 705-745, and each is communicatively connected to at least one other device via, for example, network 760 (e.g., by wired and/or wireless connections). Some devices may be communicatively connected to one or more storage devices 730 and 745.

An example of one or more devices 705-745 may be computing devices 605 described in FIG. 6, respectively. Devices 705-745 may include, but are not limited to, a computer 705 (e.g., a laptop computing device) having a monitor and an associated webcam as explained above, a mobile device 710 (e.g., smartphone or tablet), a television 715, a device associated with a vehicle 720, a server computer 725, computing devices 735-740, storage devices 730 and 745.

In some implementations, devices 705-720 may be considered user devices associated with the users, who may be remotely obtaining a sensed input used as inputs for the foregoing example implementations. In the present example implementations, one or more of these user devices 705-720 may be associated with one or more sensors such as cameras at a user's body (e.g. on glasses), or speakers associated with providing an audio output to the user, that can sense information as needed for the present example implementations, as explained above.

The present example implementations may have various benefits and advantages as compared with related art approaches. For example but not by way of limitation, related art approaches may employ communication of the information in an image pixel by pixel manner, whereas the present example implementations do not encode or preserve the pixel information, but instead the higher-level information extracted by a learned feature embedding. As a result, and by mapping the geometric structure of the feature space into the perceptual audio domain, information can be translated from a wide range of domains into perceptually meaningful audio.

Additionally, the present example implementations may provide an ability to condition the distribution of output audio signals. As a result, the user may have a great deal of control over what the translations will sound like. For example, but not by way of limitation, audio outputs may be conditioned to use the phonemes of a user's preferred spoken language. Further, and also distinction with respect to the example implementations, the related art approaches do not provide facial information or spatial audio feedback.

The example implementations described herein are further distinguishable from related art, in that while related art audio assistance devices for visually impaired people may include spatialized audio, the related art approaches do not provide human face information as well as facial expressions, emotional response, body movement qualities, or interactions.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

What is claimed is:

1. A computer implemented method, comprising:
embedding a received signal in a first modality;
re-embedding the embedded received signal of the first modality into a signal of a second modality, and generating an output in the second modality; and
based on the output, rendering a signal in the second modality that is configured to be sensed, wherein the embedding, re-embedding and generating applies a model that is trained by performing an adversarial learning operation associated with discriminating actual examples of the target distribution from the generated output, and performing a metric learning operation associated with generating the output having perceptual distances.

2. The computer implemented method of claim 1, wherein the embedding is performed by an encoder that applies a feature embedding model.

3. The computer implemented method of claim 1, wherein the re-embedding is performed by a re-embedding network.

4. The computer implemented method of claim 1, wherein the performing the adversarial learning comprises providing the generated output to a discriminator network that discriminates between the generated output and the actual version of the output, to generate a discriminator loss.

5. The computer implemented method of claim 1, wherein the performing the learning metric comprises applying a mel-frequency cepstral (MFC) transform, to generate a metric loss function associated with determining the perceptual distances.

6. The computer implemented method of claim 1, wherein the first modality is visual and the second modality is audio.

7. A non-transitory computer readable medium configured to execute machine-readable instructions on a processor, the instructions comprising:
embedding a received signal in a first modality;
re-embedding the embedded received signal of the first modality into a signal of a second modality, and generating an output in the second modality; and
based on the output, rendering a signal in the second modality that is configured to be sensed, wherein the embedding, re-embedding and generating applies a model that is trained by performing an adversarial learning operation associated with discriminating actual examples of the target distribution from the generated output, and performing a metric learning operation associated with generating the output having perceptual distances.

8. The non-transitory computer readable medium of claim 7, wherein the embedding is performed by an encoder that applies a feature embedding model.

9. The non-transitory computer readable medium of claim 7, wherein the re-embedding is performed by a re-embedding network.

10. The non-transitory computer readable medium of claim 7, wherein the performing the adversarial learning comprises providing the generated output to a discriminator network that discriminates between the generated output and the actual version of the output, to generate a discriminator loss.

11. The non-transitory computer readable medium of claim 7, wherein the performing the learning metric comprises applying a mel-frequency cepstral (WC) transform, to generate a metric loss function associated with determining the perceptual distances.

12. The non-transitory computer readable medium of claim 7, wherein the first modality is visual and the second modality is audio.

13. An apparatus, comprising:
an input device configured to receive information having a first modality;
an output device configured to output the information having a second modality; and
a processor that receives the information having the first modality and generates the information having the second modality, the processor configured to:
embed a received signal in a first modality;
re-embed the embedded received signal of the first modality into a signal of a second modality, and generate an output in the second modality; and
based on the output, render a signal in the second modality that is configured to be sensed, wherein the processor configured to embed, re-embed and generate applies a model that is trained by performing an adversarial learning operation associated with discriminating actual examples of the target distribution from the generated output, and performing a metric learning operation associated with generating the output having perceptual distances.

14. The apparatus of claim 13, wherein the input device comprises a camera and the output device comprises a speaker or a headphone.

15. The apparatus of claim 13, wherein the first modality is visual and the second modality is audio.

16. The apparatus of claim 13, wherein the input device and output device are mounted on a wearable device.

17. The apparatus of claim 16, wherein the wearable device comprises glasses.

18. The apparatus of claim 13, wherein the processor is configured to embed by an encoder that applies a feature embedding model, and to re-embed by a re-embedding network.

19. The apparatus of claim 13, wherein the performing the adversarial learning comprises providing the generated output to a discriminator network that discriminates between the generated output and the actual version of the output, to generate a discriminator loss, and the performing the learning metric comprises applying a mel-frequency cepstral (MFC) transform, to generate a metric loss function associated with determining the perceptual distances.

20. The apparatus of claim 13, wherein annotated data is not required to learn the mapping between the first modality and the second modality.

* * * * *